United States Patent
Sumasu et al.

(10) Patent No.: US 10,334,622 B2
(45) Date of Patent: *Jun. 25, 2019

(54) BASE STATION APPARATUS, MOBILE STATION APPARATUS, AND TRANSMISSION METHOD

(71) Applicant: Sun Patent Trust, New York, NY (US)

(72) Inventors: Atsushi Sumasu, Fukuoka (JP); Shozo Okasaka, Kanagawa (JP); Shinsuke Takaoka, Osaka (JP); Seigo Nakao, Singapore (SG); Daichi Imamura, Dalian (CN)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,149

(22) Filed: Nov. 21, 2017

(65) Prior Publication Data

US 2018/0098343 A1 Apr. 5, 2018

Related U.S. Application Data

(63) Continuation of application No. 15/349,388, filed on Nov. 11, 2016, now Pat. No. 9,872,310, which is a
(Continued)

(30) Foreign Application Priority Data

Jan. 29, 2009 (JP) ................................ 2009-017892

(51) Int. Cl.
*H04W 72/12* (2009.01)
*H04L 5/00* (2006.01)
(Continued)

(52) U.S. Cl.
CPC ....... *H04W 72/1284* (2013.01); *H04L 5/0053* (2013.01); *H04W 72/042* (2013.01);
(Continued)

(58) Field of Classification Search
CPC ................................................. H04W 72/1273
See application file for complete search history.

(56) References Cited

U.S. PATENT DOCUMENTS 8,654,724 B2 * 2/2014 Sumasu ................ H04L 5/0053
370/329
9,094,997 B2 * 7/2015 Sumasu ................ H04L 5/0053
(Continued)

FOREIGN PATENT DOCUMENTS

WO 2008/023644 A1 2/2008

OTHER PUBLICATIONS

Akihito Moimoto, et al., Downlink/Uplink Radio Link Connection Methods in Heterogeneous Network for LTE-Advanced, 2008.
(Continued)

*Primary Examiner* — John D Blanton
(74) *Attorney, Agent, or Firm* — Pearne & Gordon LLP

(57) ABSTRACT

A base station able to maintain backward compatibility with an LTE mobile station while minimizing the amount of increase in uplink scheduling information reception and demodulation/decoding processing in independent uplink/downlink cell data transmission. A wireless communication system includes a cell #1, a cell #2, and an LTE-A mobile station, and supports independent uplink/downlink cell data transmission. The base station of the cell #2 arranges a PDCCH+, which includes uplink scheduling information from the LTE-A mobile station to the base station of the cell #2, in a downlink data region in the downlink connection of the base station of the cell #1.

10 Claims, 9 Drawing Sheets

Related U.S. Application Data continuation of application No. 15/071,703, filed on Mar. 16, 2016, now Pat. No. 9,532,374, which is a continuation of application No. 14/718,167, filed on May 21, 2015, now Pat. No. 9,332,568, which is a continuation of application No. 14/140,750, filed on Dec. 26, 2013, now Pat. No. 9,094,997, which is a continuation of application No. 13/144,161, filed as application No. PCT/JP2010/000498 on Jan. 28, 2010, now Pat. No. 8,654,724.

(51) Int. Cl.
 H04W 72/04 (2009.01)
 H04W 88/02 (2009.01)
 H04W 88/08 (2009.01)

(52) U.S. Cl.
 CPC ..... *H04W 72/044* (2013.01); *H04W 72/0413* (2013.01); *H04W 72/1268* (2013.01); *H04W 72/1273* (2013.01); *H04W 72/1289* (2013.01); *H04L 5/0007* (2013.01); *H04L 5/0091* (2013.01); *H04W 88/02* (2013.01); *H04W 88/08* (2013.01)

(56) References Cited

U.S. PATENT DOCUMENTS

| 9,332,568 | B2* | 5/2016 | Sumasu | H04L 5/0053 |
| 9,532,274 | B2* | 12/2016 | Faurie | H04W 36/0022 |
| 9,532,374 | B2 | 12/2016 | Sumasu et al. | |
| 9,872,310 | B2* | 1/2018 | Sumasu | H04L 5/0053 |
| 2008/0205348 | A1 | 8/2008 | Malladi | |
| 2009/0122736 | A1* | 5/2009 | Damnjanovic | H04W 52/02 370/311 |
| 2009/0245190 | A1 | 10/2009 | Higuchi et al. | |
| 2009/0325585 | A1 | 12/2009 | Farajidana et al. | |
| 2010/0046356 | A1 | 2/2010 | Chun et al. | |
| 2010/0067589 | A1 | 3/2010 | Schumacher et al. | |
| 2010/0165894 | A1 | 7/2010 | Furuskar et al. | |

OTHER PUBLICATIONS

R1-074361, 3GPP TSG Ran WG1 #50bis, Distributed VRB mapping over 3PRBs, Oct. 8-12, 2007, Shanghai, China.
R1-084203, 3GPP, LG Electronics, Consideration on CoMP in LTE-Advanced, Nov. 10-14, 2008, paragraph 3.
International Search Report for PCT/JP2010/000498 dated Apr. 20, 2010.
R1-083193, 3GPP TSG RAN WG1 #54, Carrier Aggregation Operation in LTE-Advanced, Aug. 18-22, 2008, Jeju, S. Korea.
R1-083811, 3GPP TSG-RAN WG1 #54bis, Carrier Aggregation Operation in LTE-Advanced, Sep. 29-Oct. 3, 2008, Prague, Czech Republic.
R1-080356, 3GPP TSG RAN WG1 #55bis, Notion of Anchor Carrier in LTE-A, Jan. 12-16, 2009, Ljubljana, Slovenia.
R1-090207, 3GPP TSG RAN WG1 #55bis, PDCCH structure for multiple component carriers, Jan. 12-16, 2009, Ljubljana, Slovenia.
R1-082576, 3GPP TSG RAN WG1 #53bis, Inter-cell Radio Resource Management for Heterogeneous Network, Jun. 30-Jul. 4, 2008, Warsaw, Poland.

* cited by examiner

BASE STATION APPARATUS, MOBILE STATION APPARATUS, AND TRANSMISSION METHOD

CROSS-REFERENCE TO RELATED APPLICATION

This application is a continuation of U.S. patent application Ser. No. 15/071,703, filed Mar. 16, 2016, which is a continuation of U.S. patent application Ser. No. 14/718,167 filed May 21, 2015, which is a continuation of U.S. patent application Ser. No. 14/140,750 filed on Dec. 26, 2013 which is a continuation of U.S. patent application Ser. No. 13/144,161 filed on Jul. 12, 2011 which is the National Phase entry of International Application No. PCT/JP2010/000498 filed on Jan. 28, 2010 which claims the benefit of Japanese Patent Application No. 2009-017892, filed Jan. 29, 2009. The contents of these applications are incorporated herein by reference in their entireties.

TECHNICAL FIELD

The present invention relates to a base station apparatus, a mobile station apparatus, and a transmission method for transmitting uplink scheduling information to the mobile station apparatus, for example, in independent uplink/downlink cell data transmission in which an uplink data channel and a downlink data channel are connected to their respective optimum cells.

BACKGROUND ART

In the 3rd generation partnership project radio access network long term evolution advanced (3GPP LTE-A), a method of connecting a channel for uplink user data information (hereinafter referred to as "uplink data") and a channel for downlink user data information (hereinafter referred to as "downlink data") to their respective optimum cells (independent uplink/downlink cell data transmission) is under consideration (see Non Patent Literature 1).

FIG. 1 shows a situation of independent uplink/downlink cell data transmission in which a physical downlink shared channel (PDSCH) is connected to cell #1 and a physical uplink shared channel (PUSCH) is connected to cell #2. A PDSCH is a downlink data channel in which downlink data is arranged and a PUSCH is an uplink data channel in which uplink data is arranged.

An independent base station apparatus (eNB, hereinafter referred as "base station") is provided in each of cell #1 and cell #2, and backhaul between cell #1 and cell #2 is configured with an X2 interface. Here, when cell #1 is the cell having the best downlink channel quality for an LTE-A mobile station (hereinafter referred to as "mobile station"), and cell #2 is the cell having the best uplink channel quality for the LTE-A mobile station, in independent uplink/downlink cell data transmission, as shown in FIG. 1, a PDSCH is connected to cell #1, and a PUSCH is connected to cell #2.

Further, because a channel (for example, a PUCCH) for controlling feedback (FB) such as acknowledgement/negative acknowledgement (ACK/NACK) needs to transmit a feedback at a high speed, the FB control channel is connected to the same cell as for a downlink data channel, not the same cell as for an uplink data channel which provides an optimum link connection. If the FB control channel is connected to the same cell as for an uplink data channel which provides an optimum link connection, and communication between independent cells is performed via backhaul, such communication would take time on the order of several to several dozens of subframes, making it difficult to transmit feedback in the FB control channel at a high speed. However, when connecting to the same cell as for a downlink data channel, it is possible to transmit feedback in the FB control channel at a high speed.

As described above, in independent uplink/downlink cell data transmission, an uplink data channel and a downlink data channel are connected to their respective optimum cells. At this time, scheduling information (control information for designating modulation coding scheme (MCS) or resource block (RB)) needs to be reported to an LTE-A mobile station at a high speed.

In an LTE downlink channel, downlink scheduling information is reported using a PDCCH in the same subframe as the subframe containing the PDSCH in which downlink data is arranged. Further, in an LTE uplink channel, uplink scheduling information is reported to an LTE mobile station using a PDCCH four subframes before the subframe containing a PUSCH in which uplink data is arranged.

In an LTE-A, as a method of reporting uplink scheduling information, a method in which uplink scheduling information is transferred from cell #2 to cell #1 in real time and reported to an LTE-A mobile station using a PDCCH of cell #1, is possible. However, because it will take time to communicate via Backhaul in which cell #1 and cell #2 are connected with an X2 interface, it is difficult to transfer uplink scheduling information from cell #2 to cell #1 at high speed.

As another method, a method in which the base station of cell #2 transmits a PDCCH containing uplink scheduling information for an LTE-A mobile station to the LTE-A mobile station, is possible. For example, as shown in FIG. 2, downlink scheduling information for an LTE-A mobile station is transmitted using a PDCCH from the base station of cell #1 to which a PDSCH is connected, and uplink scheduling information for the LTE-A mobile station is transmitted using a PDCCH from the base station of cell #2 to which a PUSCH is connected. Here, if uplink scheduling information for an LTE mobile station is transmitted to the LTE mobile station in which the PUSCH is connected to cell #1 by containing the information in the PDCCH, as is conventionally done, the LTE mobile station in cell #1 can connect to cell #1, as is conventionally done, making it possible to maintain a backward compatibility with the LTE mobile station.

CITATION LIST

Non-Patent Literature

NPL 1
"Downlink/Uplink Radio Link Connection Methods in Heterogeneous Network for LTE-Advanced", annual conference of the Institute of Electronics, Information and Communication Engineers (ISCIE), B-5-14, 2008.

SUMMARY OF INVENTION

Technical Problem

However, an LTE-A mobile station requires a plurality of circuits for receiving, at the same time, PDCCHs which are transmitted in the same resource element (RE) region from each of cell #1 to which a PDSCH is connected and cell #2 to which a PUSCH is connected, and demodulating and decoding the PDCCHs, making the reception circuit bigger and more complex.

It is therefore an object of the present invention to provide a base station apparatus, a mobile station, and a transmission method for suppressing the amount of increase in reception and demodulation and decoding processing of uplink scheduling information in independent uplink/downlink cell data transmission in which an uplink data channel and a downlink data channel are connected to their respective optimum cells.

Solution To Problem

A base station apparatus according to the present invention employs a configuration to have a base station apparatus in a radio communication system including a mobile station apparatus that receives downlink data that is transmitted in a downlink data region of a first base station apparatus and transmits uplink data in an uplink data region of a second base station apparatus, the first base station apparatus, and the second base station apparatus, the base station apparatus being the second base station apparatus and comprising: an arrangement section that arranges a control signal containing scheduling information of uplink data to transmit from the mobile station apparatus to the second base station apparatus, in the downlink data region of the first base station apparatus; and a transmission section that transmits the control signal to the mobile station apparatus.

A mobile station apparatus according to the present invention employs a configuration to have a mobile station apparatus in a radio communication system including a mobile station apparatus that receives downlink data that is transmitted in a downlink data region of a first base station apparatus, and transmits uplink data in an uplink data region of a second base station apparatus, the first base station apparatus, and the second base station apparatus, comprising; a reception section that receives a control signal containing scheduling information of uplink data for the second base station apparatus, that is arranged in the downlink data region of the first base station apparatus; an arrangement section that arranges the uplink data in a resource indicated by the scheduling information of uplink data; and a transmission section that transmits the arranged uplink data to the second base station apparatus.

A transmission method according to the present invention employs a transmission method in a radio communication system including a mobile station apparatus that receives downlink data that is transmitted in a downlink data region of a first base station apparatus, and transmits uplink data in an uplink data region of a second base station apparatus, the first base station apparatus, and the second base station apparatus, a method of transmitting scheduling information of uplink data to transmit from the mobile station apparatus to the second base station apparatus to the mobile station apparatus, the method comprising: arranging a control signal containing the scheduling information of uplink data to transmit from the mobile station apparatus to the second base station apparatus in the downlink data region of the first base station apparatus; and transmitting the control signal to the mobile station apparatus.

A transmission method according to the present invention employs a transmission method in a radio communication system including a mobile station apparatus that receives downlink data that is transmitted in a downlink data region of a first base station apparatus, and transmits uplink data in an uplink data region of a second base station apparatus, the first base station apparatus, and the second base station apparatus, a method of transmitting scheduling information of uplink data to transmit from the mobile station apparatus to the second base station apparatus to the mobile station apparatus, the method comprising: arranging a control signal containing the scheduling information of uplink data to transmit from the mobile station apparatus to the second base station apparatus in the downlink data region of the first base station apparatus; and transmitting the control signal to the mobile station apparatus.

Advantageous Effects of Invention

According to the present invention, it is possible to suppress the amount of increase in reception and demodulation and decoding processing of uplink scheduling information in independent uplink/downlink cell data transmission in which an uplink data channel and a downlink data channel are connected to their respective optimum cells.

DESCRIPTION OF EMBODIMENTS

Now, embodiments of the present invention will be described in detail with reference to the accompanying drawings.

Figure 1:
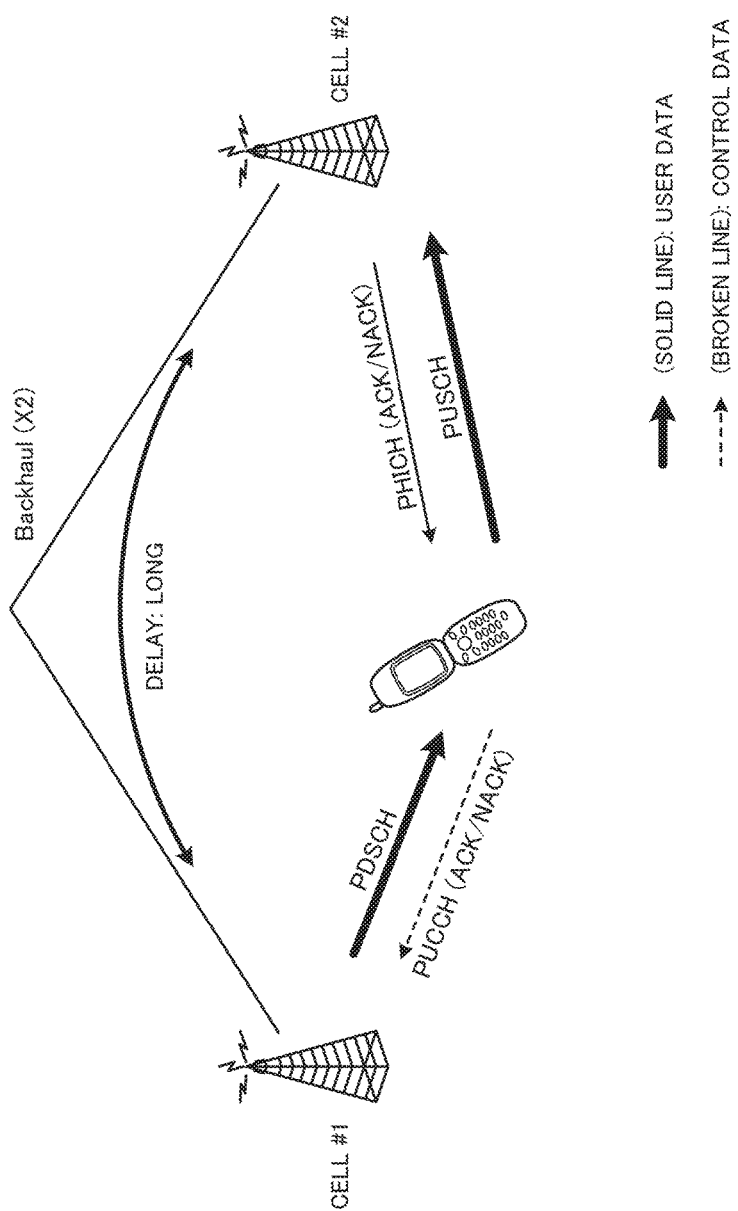
FIG. 1 shows independent uplink/downlink cell data transmission.

A figure of the overall configuration of a radio communication system according to the present embodiment is the same as in FIG. 1. A radio communication system according to the present embodiment includes cell #1, cell #2, and an LTE-A mobile station and supports independent uplink/downlink cell data transmission. In FIG. 1, an independent base station (eNB) is set in each of cell #1 and cell #2, and a backhaul between cell #1 and cell #2 is configured with an X2 interface. Further, timing of downlink resource of cell #1 and timing of downlink resource of cell #2 are orthogonal by inter-cell synchronization.

A case will be described below with the present embodiment where cell #1 is the cell having the best downlink channel quality for an LTE-A mobile station and cell #2 is the cell having the best uplink channel quality for the LTE-A mobile station. That is, a case will be described below with the present embodiment where downlink user data information (downlink data) is transmitted to an LTE-A mobile station using a PDSCH in a downlink data region of cell #1, and uplink user data information (uplink data) is transmitted from the LTE-A mobile station using a PUSCH in an uplink data region of cell #2. Here, channel quality is calculated from a reception result of reference signals, for example.

(Embodiment 1)

Figure 3:
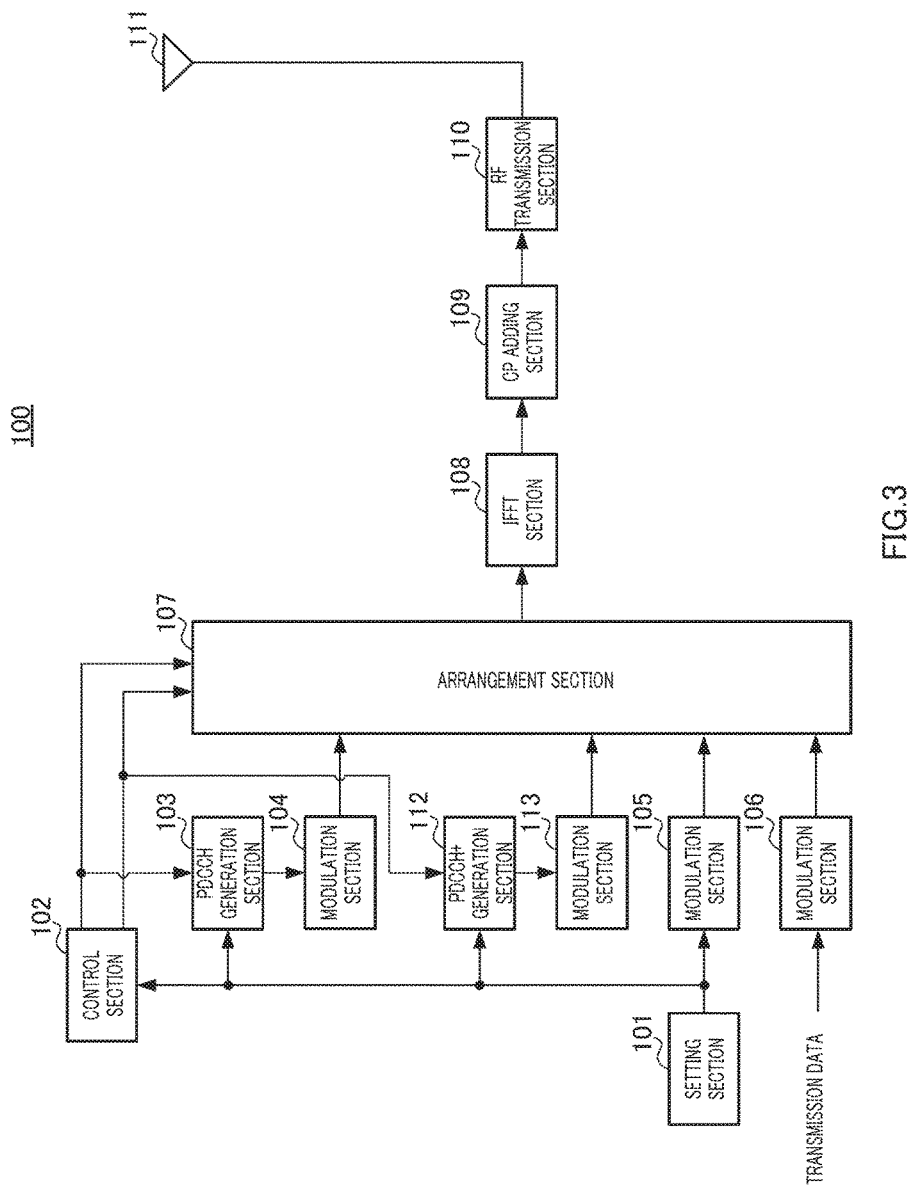
FIG. 3 is a block diagram showing a configuration of parts of the base station according to Embodiment 1 of the present invention relating to downlink channel transmission.

FIG. 3 is a block diagram showing a configuration of parts of a base station according to the present embodiment relating to downlink channel transmission. The base station shown in FIG. 3 is applicable to the base station of cell #2 in FIG. 1.

In base station 100 in FIG. 3, setting section 101 configures one or a plurality of resource blocks (RB) to use for each of an uplink channel and a downlink channel, for each mobile station, according to, for example, a required transmission rate or the amount of data transmission. Further, setting section 101 configures a mobile station ID that is different per resource block for each mobile station. Setting section 101 outputs this setting information to control section 102, PDCCH generation section 103, modulation section 105, and PDCCH+ generation section 112.

Control section 102 generates scheduling information of uplink resource (for example, a PUSCH) for allocating uplink data of an LTE mobile station (hereinafter referred to as "uplink scheduling information") and scheduling information of downlink resource (for example, a PDSCH) for allocating downlink data for an LTE mobile station (hereinafter referred to as "downlink scheduling information"), based on the setting information input from setting section 101. Further, control section 102 generates uplink scheduling information of uplink resource (for example, a PUSCH) for allocating uplink data of an LTE-A mobile station, based on the setting information input from setting section 101.

Further, control section 102 outputs uplink scheduling information and downlink scheduling information for an LTE mobile station to PDCCH generation section 103 and arrangement section 107. Further, control section 102 outputs uplink scheduling information for an LTE-A mobile station to PDCCH+ generation section 112 and arrangement section 107.

PDCCH generation section 103 allocates the uplink and downlink scheduling information for an LTE mobile station input from control section 102 to a PDCCH that is to be arranged in a resource block configured for each mobile station, based on the setting information input from setting section 101. Further, PDCCH generation section 103 adds cyclic redundancy check (CRC) bits to PDCCH to which uplink and downlink scheduling information for an LTE mobile station is allocated, and then masks (or scrambles) the CRC bits using the mobile station ID input from setting section 101. Then, PDCCH generation section 103 outputs the masked PDCCH to modulation section 104.

Modulation section 104 performs channel encoding on and modulates the PDCCH input from PDCCH generation section 103, and outputs modulated PDCCH to arrangement section 107.

Modulation section 105 modulates the setting information input from setting section 101 and outputs the modulated setting information to arrangement section 107.

Modulation section 106 performs channel encoding on and modulates the input transmission data (downlink channel data), and outputs the modulated data signal to arrangement section 107.

PDCCH+ generation section 112 connects the PDSCH to cell #1 and allocates the uplink scheduling information for an LTE-A mobile station that receives downlink data transmitted in a downlink data region of cell #1, to a PDCCH+ that is to be arranged in some of the resource blocks in a downlink data region of cell #1. Further, PDCCH+ generation section 112 adds the CRC bits to the PDCCH+ to which uplink scheduling information for the LTE-A mobile station is allocated, and then masks (or scrambles) the CRC bits using the mobile station ID input from setting section 101. Then, PDCCH+ generation section 112 outputs the masked PDCCH+ to modulation section 113.

Modulation section 113 performs channel encoding on and modulates the PDCCH+ input from PDCCH+ generation section 112, and outputs the modulated PDCCH+ to arrangement section 107.

Arrangement section 107 multiplexes the PDCCH input from modulation section 104, the setting information input from modulation section 105, the data signal (i.e. the PDSCH) input from modulation section 106, and the PDCCH+ input from modulation section 113. Here, arrangement section 107 arranges (multiplexes) the PDCCH and the data signal (PDSCH) to each resource block based on the downlink scheduling information for the LTE mobile station and downlink scheduling information for the LTE-A mobile station that are input from control section 102. Further, arrangement section 107 may arrange setting information to the PDSCH. Further, arrangement section 107 arranges the PDCCH+ in some of the resource blocks in the downlink data region of cell #1. Further, a specific method of arranging (multiplexing) a PDCCH, a PDCCH+, and a data signal in arrangement section 107 will be described later.

Arrangement section 107 outputs the multiplexed signal to inverse fast Fourier transform (IFFT) section 108.

IFFT section 108 performs IFFT processing on the signal input from arrangement section 107 to obtain a time domain signal. Further, IFFT section 108 outputs the time domain signal to cyclic prefix (CP) adding section 109.

CP adding section 109 adds a CP to the time domain signal input from IFFT section 108 and outputs the signal with a CP to radio frequency (RF) transmission section 110.

RF transmission section 110 performs transmission processing, such as digital-to-analog (D/A) conversion, up-conversion, and amplification, to the signal input from CP adding section 109, and transmits by radio the signal on which transmission processing is performed, from antenna 111 to a mobile station.

Figure 4:
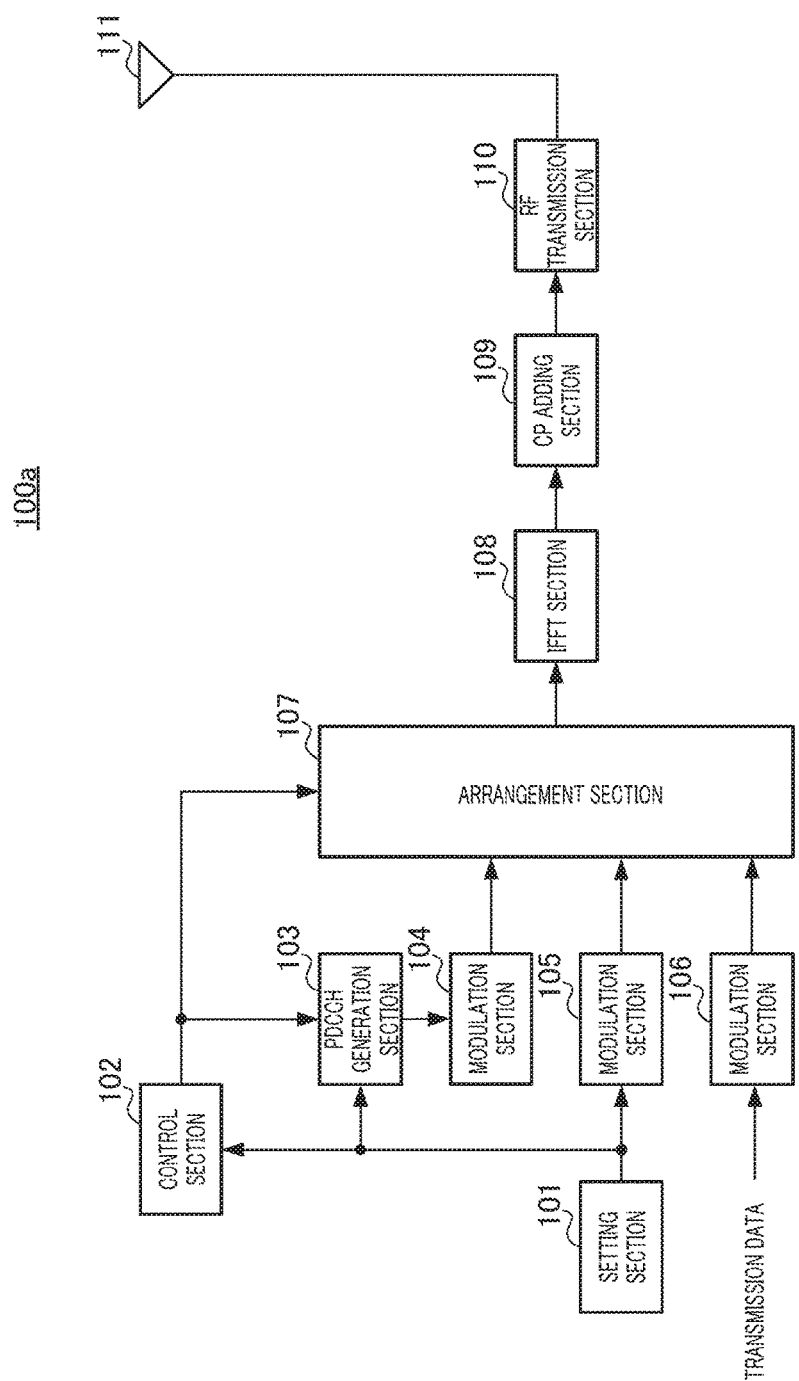
FIG. 4 is a block diagram showing a configuration of parts of a conventional base station relating to downlink channel transmission.

Further, when PDCCH+ generation section 112 and modulation section 113 are removed from the configuration of an LTE-A base station in FIG. 3, the same configuration as a conventional LTE base station is obtained. FIG. 4 is a block diagram showing a configuration of a conventional LTE base station. Further, parts in the LTE base station in FIG. 4 that are the same as the LTE-A base station in FIG. 3 will be assigned the same reference numerals as in FIG. 3.

Figure 5:
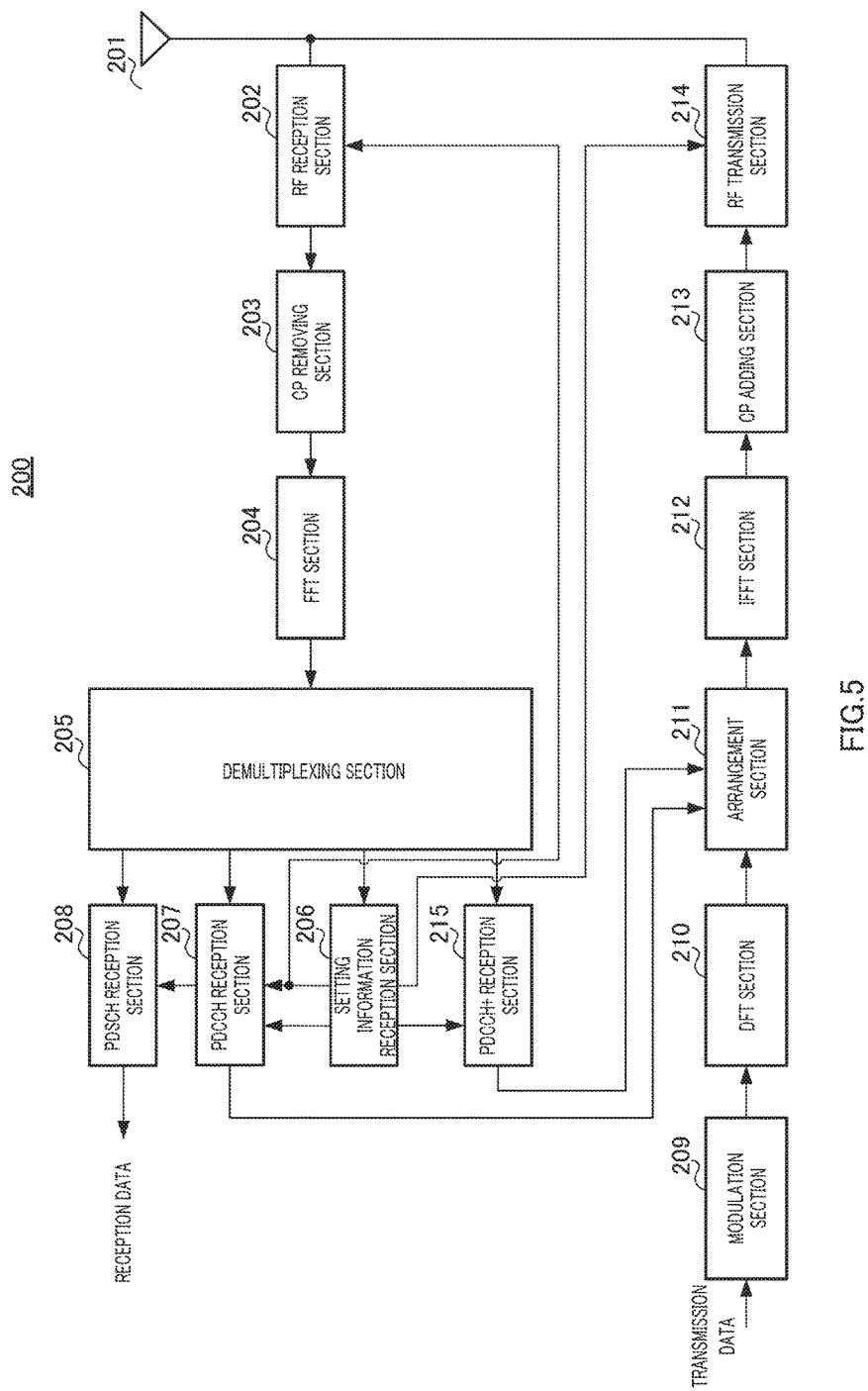
FIG. 5 is a block diagram showing a configuration of an LTE-A mobile station according to Embodiment 1.

FIG. 5 is a block diagram showing a configuration of an LTE-A mobile station according to the present embodiment. The LTE-A mobile station in FIG. 5 receives the downlink data transmitted in the downlink data region in the base station of cell #1 and transmits uplink data in the uplink data region in the base station of cell #2, as shown in FIG. 1.

RF reception section 202 is configured to be able to change a reception bandwidth, and changes the reception bandwidth based on bandwidth information input from setting information reception section 206. Further, RF reception section 202 performs a radio reception processing on a reception radio signal received via antenna 201 (here, such as down-conversion and analog-to-digital (A/D) conversion on an orthogonal frequency division multiplex (OFDM) signal), and outputs the obtained reception signal to CP removing section 203.

CP removing section 203 removes the CP from the reception signal input from RF reception section 202 and outputs the signal without a CP to fast Fourier transform (FFT) section 204.

FFT section 204 performs FFT processing on the signal input from CP removing section 203 to obtain a frequency domain signal. Then, FFT section 204 outputs the frequency domain signal to demultiplexing section 205.

Demultiplexing section 205 demultiplexes the frequency domain signal input from FFT section 204 into a higher layer control signal containing setting information (for example, radio resource control (RRC) signaling), a PDCCH, a PDCCH+, and a data signal (i.e. a PDSCH). Then, demultiplexing section 205 outputs the control signal to setting information reception section 206, outputs the PDCCH to PDCCH reception section 207, outputs the PDCCH+ to PDCCH+ reception section 215, and outputs the PDSCH to PDSCH reception section 208.

Setting information reception section 206 reads information indicating uplink and downlink resource blocks that are configured in the LTE-A mobile station, from the control signal input from demultiplexing section 205, and outputs information about the downlink resource block to PDCCH reception section 207 and RF reception section 202 as bandwidth information, and outputs information about the uplink resource block to RF transmission section 214 as bandwidth information. Further, setting information reception section 206 reads the mobile station ID that is set to the LTE-A mobile station, from the control signal input from demultiplexing section 205, and outputs the mobile station ID to PDCCH reception section 207.

Further, setting information reception section 206 reads information indicating the uplink resource block that is set to the LTE-A mobile station, from the control signal input from demultiplexing section 205, and outputs information about uplink resource block to RF transmission section 214 as bandwidth information. Further, setting information reception section 206 reads the mobile station ID that is set to the LTE-A mobile station, from the control signal input from demultiplexing section 205, and outputs the mobile station ID to PDCCH+ reception section 215.

PDCCH reception section 207 receives blindly the PDCCH input from demultiplexing section 205. Here, each PDCCH is arranged to the downlink resource block that is configured for the LTE-A mobile station and is indicated in the bandwidth information input from setting information reception section 206. PDCCH reception section 207 reads the downlink scheduling information contained in the PDCCH and outputs the downlink scheduling information to PDSCH reception section 208. Further, when uplink scheduling information is contained in the PDCCH, PDCCH reception section 207 reads the uplink scheduling information and outputs the uplink scheduling information to arrangement section 211.

PDSCH reception section 208 demodulates the PDSCH input from demultiplexing section 205 according to the downlink scheduling information input from PDCCH reception section 207 to obtain the received data.

PDCCH+ reception section 215 receives blindly the PDCCH+ input from demultiplexing section 205. Here, the PDCCH+ signal is arranged in some of the resource blocks of the downlink data region in cell #1. PDCCH+ reception section 215 reads the uplink scheduling information contained in PDCCH+ and outputs the uplink scheduling information to arrangement section 211.

Modulation section 209 performs channel encoding on and modulates the input transmission data (uplink data), and outputs the modulated data signal to discrete Fourier transform (DFT) section 210.

DFT section 210 performs FFT processing on the data signal input from modulation section 209 to obtain a frequency domain signal. Then, DFT section 210 outputs the frequency domain signal to arrangement section 211.

Arrangement section 211 arranges the frequency domain signal input from DFT section 210 to the PUSCH arranged on a uplink resource block, according to the uplink scheduling information input from PDCCH reception section 207 or PDCCH+ reception section 215.

IFFT section 212 performs IFFT processing on the frequency domain signal input from arrangement section 211 to obtain a time domain signal. Then, IFFT section 212 outputs the time domain signal to CP adding section 213.

CP adding section 213 adds a CP to the time domain signal input from IFFT section 212 and outputs the signal with a CP to RF transmission section 214.

RF transmission section 214 performs transmission processing, such as digital-to-analog (D/A) conversion, up-conversion, and amplification, to the signal input from CP adding section 213, and transmits by radio the signal on which transmission processing is performed, from antenna 201 to an LTE mobile station or an LTE-A base station.

Figure 6:
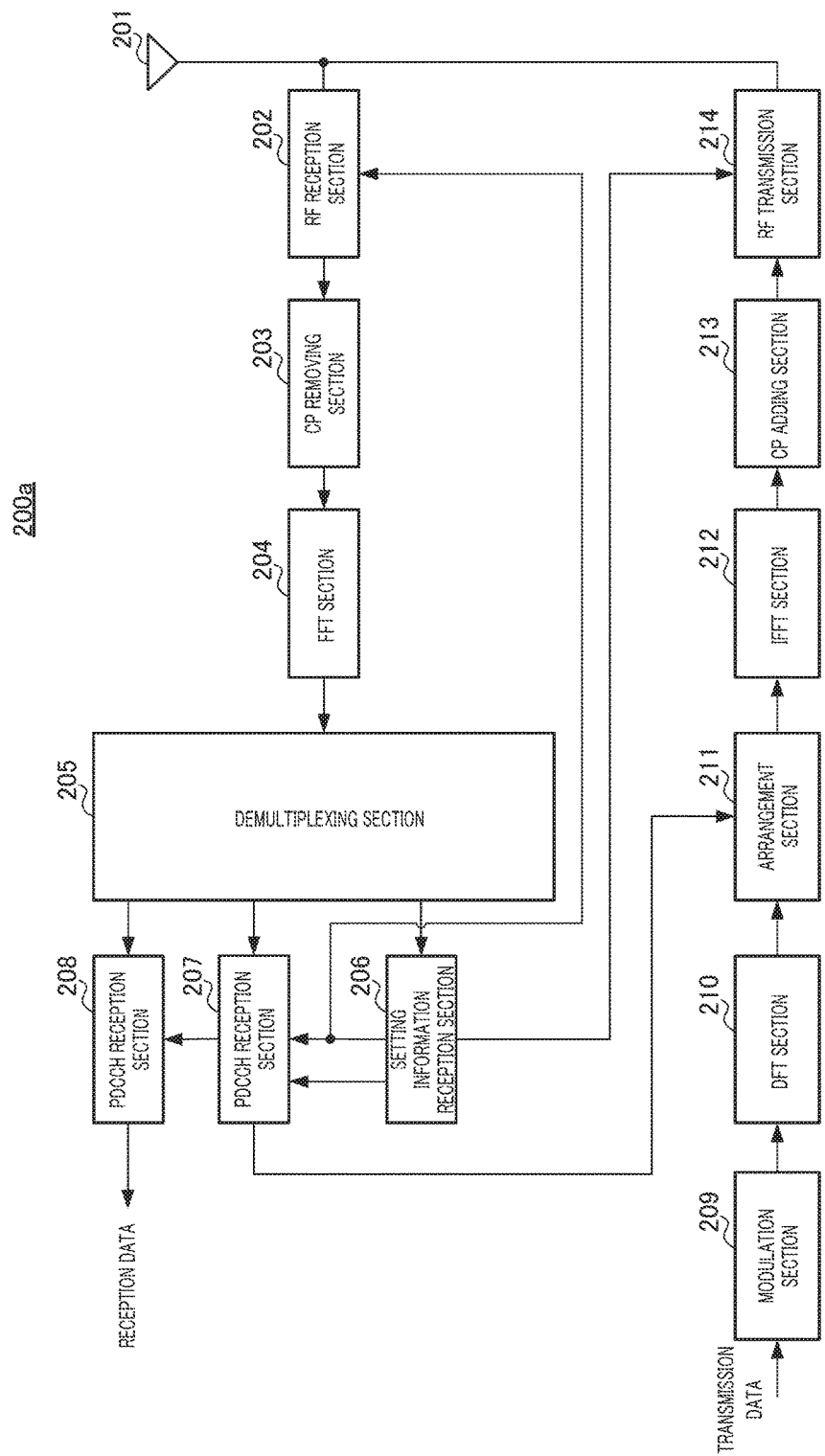
FIG. 6 is a block diagram showing a configuration of a conventional LTE mobile station.

Further, when PDCCH+ reception section 215 is removed from the configuration of the LTE-A base station in FIG. 5, the same configuration as a conventional LTE base station can be obtained. FIG. 6 is a block diagram showing a configuration of a conventional LTE mobile station. Further, parts in the LTE base station in FIG. 6 that are the same as in the LTE-A base station in FIG. 5 will be assigned the same reference numerals as in FIG. 5.

A method of transmitting scheduling information of uplink data to the base station of cell #2 will be described below.

Figure 7A:
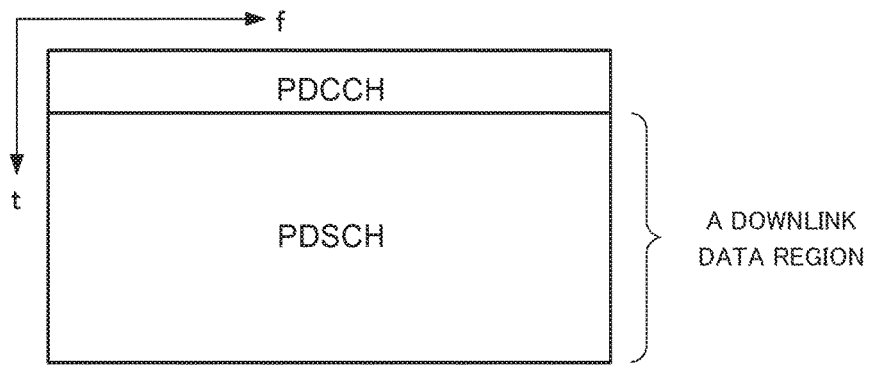
FIG. 7A shows allocation of resources to an LTE downlink channel that is transmitted from the base station of cell #1.

FIG. 7A shows allocation of resources to an LTE downlink channel that is transmitted from the base station of cell #1. As described above, in an LTE downlink channel, a base station reports the uplink and downlink scheduling information by a PDCCH in the same subframe as the subframe containing a PDSCH in which downlink data is arranged. Further, in a subframe, a region in which downlink data can be arranged is hereinafter referred to as "downlink data region."

Figure 7B:
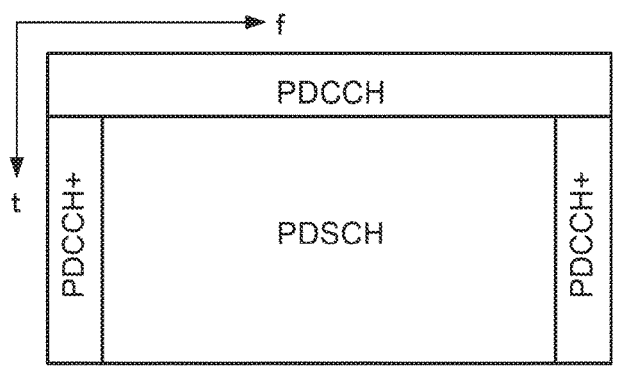
FIG. 7B shows an example of allocation of resources to an LTE-A downlink channel that is transmitted from the base station of cell #2.

FIG. 7B shows an example of allocation of resources to an LTE-A downlink channel that is transmitted from the base station of cell #2. The base station of cell #2 reports downlink scheduling information of an LTE mobile station by a PDCCH in the same subframe as the subframe containing a PDSCH in which downlink data is arranged. That is, in FIG. 7B, the PDCCH is a control channel for an LTE mobile station of cell #2 and the PDSCH is a data channel for the LTE mobile station of cell #2.

Further, the base station of cell #2 arranges a PDCCH+ for an LTE-A mobile station in part of the downlink data region of cell #1. The PDCCH+ in FIG. 7B is a control channel for the LTE-A mobile station for connecting the PUSCH to cell #2.

Figure 7C:
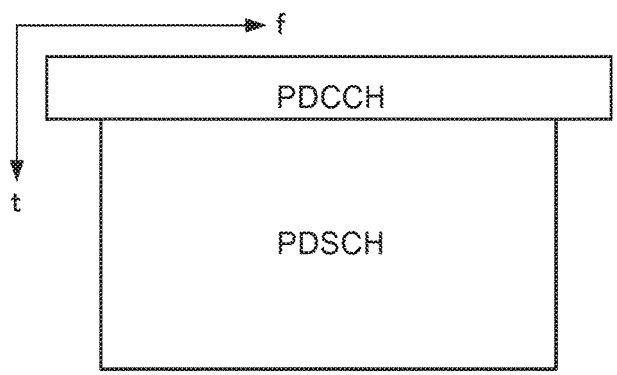
FIG. 7C shows allocation of resources to an LTE-A downlink channel that is transmitted from the base station of cell #1.

FIG. 7C shows allocation of resources to an LTE-A downlink channel that is transmitted from the base station of cell #1. The base station of cell #1 reports the downlink scheduling information of an LTE-A mobile station using a PDCCH in the same subframe as the subframe containing a PDSCH in which downlink data is arranged. Further, the base station of cell #1 arranges a PDSCH for an LTE-A mobile station outside the region in which a PDCCH+ transmitted from the base station of cell #2 is arranged, in the downlink data region of cell #1, and transmits the PDSCH.

Figure 8:
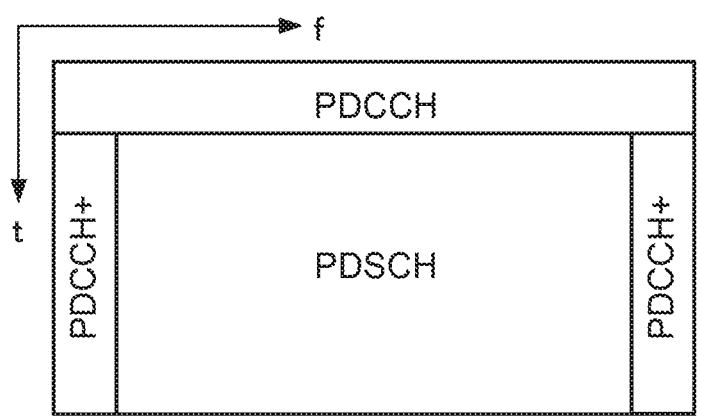
FIG. 8 shows resources received by an LTE-A mobile station.

FIG. 8 shows resources received by an LTE-A mobile station out of the LTE-A downlink channel transmitted from the base station of cell #1 (FIG. 7C) and the downlink channel transmitted from the base station of cell #2 (FIG. 7B).

As shown in FIG. 8, the LTE-A mobile station receives a PDCCH and a PDSCH transmitted from the base station of cell #1. By this means, the LTE-A mobile station can receive downlink data from cell #1. As described above, the base station of cell #1 arranges a PDSCH outside the region in which the PDCCH+ is arranged, in the downlink data region of cell #1, and transmits the PDSCH. Further, the LTE-A mobile station receives a PDCCH+ transmitted from cell #2. By demodulating the PDCCH+, the LTE-A mobile station can obtain uplink scheduling information.

Further, uplink scheduling information has only to be reported four subframes before PUSCH transmission, so that, unlike downlink scheduling information, it is not necessary to arrange uplink scheduling information in the head of a subframe containing a PDSCH. That is, as shown in FIG. 7B, even when a PDCCH+ is arranged in part of the downlink data region of cell #1, the LTE-A mobile station can obtain uplink scheduling information before the transmission of a PUSCH.

Further, as shown in FIG. 7B, when PDCCH+s are arranged at the ends of the downlink data region of cell #1, it is possible to obtain frequency diversity gain.

Further, when the base station of cell #2 arranges a PDCCH+ according to the unit of LTE PDSCH resource allocation (RB unit), the LTE mobile station recognizes the PDCCH+ as "an RB that is not simply allocated to that LTE mobile station." Further, because an LTE mobile station can perform demodulation using a reference signal corresponding to the demodulation segments of cell #1 and cell #2, the LTE mobile station will not be influenced by allocation of a PDCCH+. Accordingly, a radio communication system can accommodate an LTE mobile station at the same time, making it possible to maintain backward compatibility with LTE. Further, a resource block does not need to be configured with serial resource elements, and can be a virtual resource block.

As described above, according to the present embodiment, it is possible to arrange a PDCCH+ containing uplink scheduling information to transmit from an LTE-A mobile station to the base station of cell #2, in the downlink data region in the downlink channel of the base station of cell #1. By this means, the LTE-A mobile station can obtain uplink and downlink scheduling information in the independent uplink/downlink cell data transmission, without receiving a plurality of PDCCHs that are transmitted from cell #1 and cell #2 using the same resource element region.

Further, by arranging a PDCCH+ containing uplink scheduling information according to the unit of LTE PDSCH resource allocation (RB unit), a radio communication system can accommodate an LTE mobile station at the same time, making it possible to maintain the backward compatibility with LTE.

Further, by having the base station of cell #2 report information about the region in which a PDCCH+ is arranged, such as allocating the PDCCH+ in the Nth RB from both ends of the downlink data region of cell #1, to neighboring cells, the LTE-A mobile station can relieve blind reception processing of the PDCCH+. As a method of relieving blind reception processing, the base station of cell #1 may broadcast neighboring cell information including information about in which RB a PDCCH+ in a neighboring cell is allocated, using, for example, a broadcast channel (BCH). Further, the base station of cell #1 may order each neighboring cell to report the uplink channel quality of the neighboring cell, set a PDCCH+ region according to the report from each neighboring cell, and report information about the set PDCCH+ region to the mobile station. For example, it is possible to set a PDCCH+ region in the downlink data region of the cell having the best uplink channel quality out of the cells from which a report is received, and report information about the set PDCCH+ region to neighboring cells.

(Embodiment 2)

A method of transmitting a PDCCH+ containing the uplink scheduling information of cell #2 has been described with Embodiment 1.

In this regard, when a reference signal of cell #1 and a reference signal of cell #2 are arranged to overlap in the same resource element region, if the channel quality of cell #2 is poorer than the channel quality of cell #1, it is difficult to estimate the channel quality of cell #2 with sufficient accuracy. Further, as the number of antennas increases, the probability in which reference numbers are arranged to overlap in the same resource element region between neighboring cells increases.

Therefore, according to the present embodiment, the density of reference signals (RSs) for a PDCCH+ in the PDCCH+ region of cell #2 is increased. By this means, even when it is difficult to perform channel estimation with sufficient accuracy by using only RSs neighboring a PDCCH+, it is possible to increase the accuracy of channel quality estimation with respect to cell #2.

Figure 9:
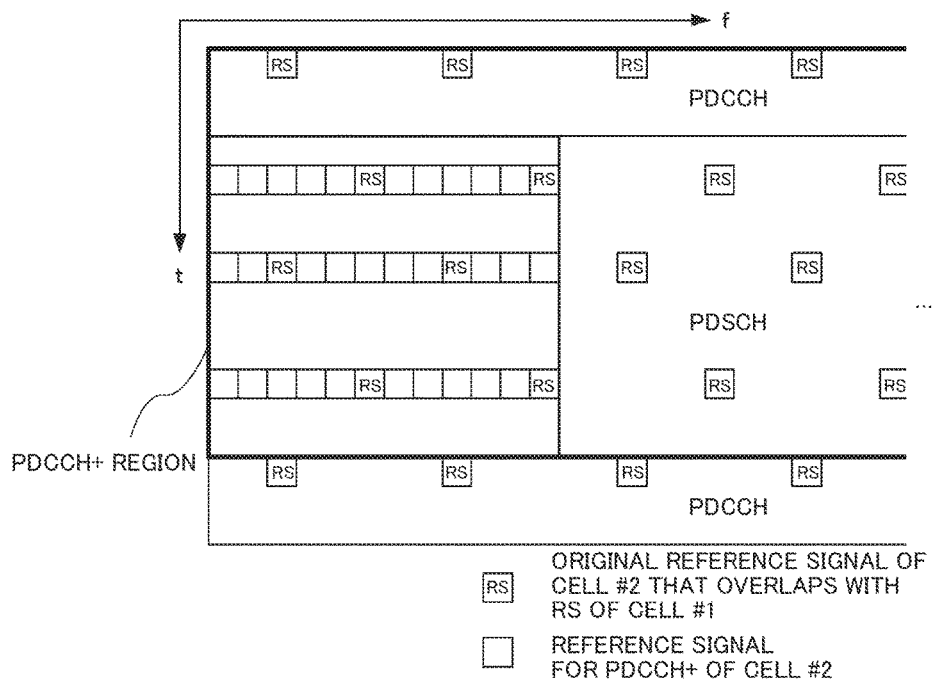
FIG. 9 shows an example of arrangement of reference signals according to Embodiment 2 of the present invention.

FIG. 9 shows an example of arrangement of reference signals according to the present embodiment. Further, FIG. 9 shows part of the low frequency side in the downlink channel region. An example of arrangement shown in FIG. 9 is a case where RSs for PDCCH+ are arranged in all resource elements of the fifth, eight, and twelfth OFDM symbols in the PDCCH+ region.

In FIG. 9, a square box with the indication of "RS" is a resource element (RE) in which reference signals of cell #1 and cell #2 are arranged to overlap. Therefore, when estimating the channel quality of cell #2 using only the reference signals that are arranged to overlap without arranging additional reference signals, if the channel quality of cell #2 is poorer than the channel quality of cell #1, it is difficult for the LTE-A mobile station to estimate the channel quality of cell #2 with sufficient accuracy.

On the other hand, as shown in FIG. 9, when additionally arranging RSs for the PDCCH+ for all REs of the fifth, eighth, and twelfth OFDM symbols in the PDCCH+ region, the number of RSs transmitted from cell #2 increases and the accuracy of channel quality estimation with respect to cell

2 can be increased, and, as a result of this, it is possible to set, for example, MCS corresponding to the channel quality, improving the quality of the PDCCH+.

As described above, according to the present embodiment, a reference signal is arranged in an available resource element of a resource block (a PDCCH+ region) in which the PDCCH+ is arranged. By this means, it is possible to increase the accuracy of channel estimation with respect to cell #2, and, by transmitting a feedback of this accuracy of channel estimation, it is possible to improve the reception quality of the PDCCH+.

In this regard, the position at which a reference signal is arranged is not limited, and the reference signal can be arranged at the both ends of the PDCCH+ region or arranged in a scattered manner. Further, when the PDCCH+ region overlaps between neighboring cells, it is possible to perform (inter-cell) coordination in which, for example, a signal is not transmitted to the RE that is used in other RS, by arranging each RE for RS differently.

(Embodiment 3)

Figure 2:
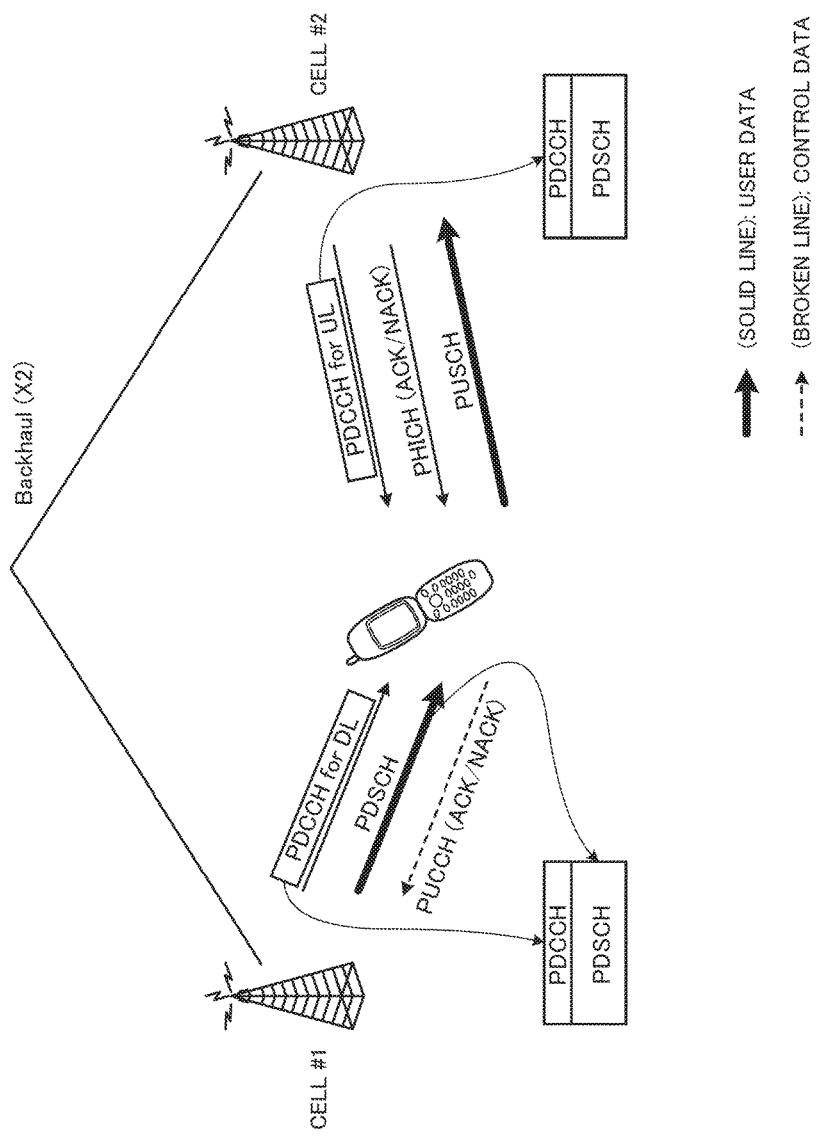
FIG. 2 shows a method of transmitting uplink scheduling information for an LTE-A mobile station.

A case has been described with Embodiment 1 where an LTE-A mobile station receives a PDCCH and a PDSCH that are transmitted from the base station of cell #1 and receives a PDCCH+ transmitted from the base station of cell #2, as shown in FIG. 2.

Figure 10:
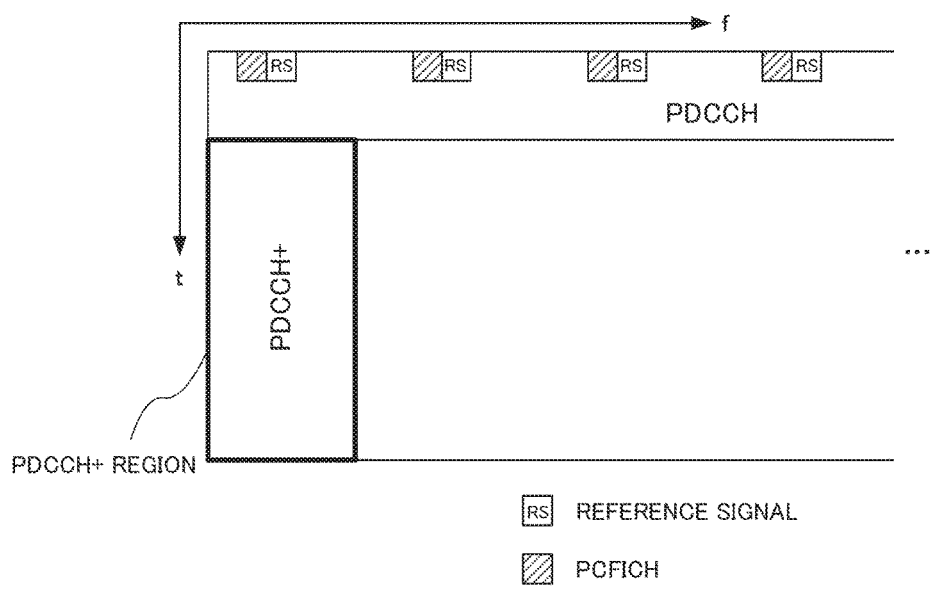
FIG. 10 shows arrangement of PCFICH.

At this time, as shown in FIG. 10, control signals, such as a PDCCH and a physical control format indicator channel (PCFICH), are transmitted using the first OFDM symbol from the base station of cell #2 to the LTE mobile station in cell #2. Here, a PCFICH is a control signal for reporting the number of OFDM symbols (variable from 1 to 3) in which a PDCCH is arranged. As shown in FIG. 10, the PCFICH is arranged in the first OFDM symbol. FIG. 10 shows part of the low-frequency side in the downlink channel region.

As explained in Embodiment 1, an LTE-A mobile station does not receive the first OFDM symbol to be transmitted from the base station of cell #2, and receives the first OFDM symbol to be transmitted from the base station of cell #1. That is, because the LTE-A mobile station does not demodulate the PCFICH that is contained in the first OFDM symbol to be transmitted from the base station of cell #2, the number of the OFDM symbols in which a PDCCH of cell #2 is arranged is not known.

Therefore, when the base station of cell #2 arranges a PDCCH+ using the OFDM symbol immediately after the OFDM symbol in which a PDCCH is arranged, it is difficult for an LTE-A mobile station to correctly demodulate the PDCCH+ because the start OFDM symbol of the PDCCH+ is not known.

Therefore, the PDCCH+ of cell #2 is arranged in the symbol subsequent to the maximum number of OFDM symbols 3, i.e. in the fourth symbol and afterward, unconditionally regardless of the number of OFDM symbols in which the PDCCH is arranged. By this means, by fixing the start position of the PDCCH+ of cell #2 to the fourth OFDM symbol, the LTE-A mobile station can reliably demodulate the PDCCH+ without receiving the PCFICH that is contained in the first OFDM symbol to be transmitted from cell #2. That is, when assuming that the maximum number of symbols in which the PDCCH containing downlink data scheduling information is arranged is set as D, by arranging a PDCCH+ containing scheduling information of uplink data to transmit from a mobile station to cell #2 in the (D+1)-th symbol and afterward, an LTE-A mobile station can reliably obtain uplink data scheduling information.

In this regard, a PDCCH of cell #2 is arranged in the first to third OFDM symbols. Here, when the PDCCH of cell #2 is arranged only in the first OFDM symbol, it is possible to put a signal, such as an additional reference signal or a specific pattern signal, that can be used or determined by blind reception even when whether or not the signal is transmitted is not known in advance, in an RE having the same bandwidth in which a PDCCH+ is arranged, out of the second and third OFDM symbols. Similarly, when the PDCCH of cell #2 is arranged only in the first and second OFDM symbols, it is possible to put a signal, such as an additional reference signal or a specific pattern signal, that can be used or determined by blind reception even when whether or not the signal is transmitted is not known in advance, in an RE having the same bandwidth as the bandwidth in which the PDCCH+ is arranged, in the third OFDM symbol. By this means, it is possible to increase the reception quality and the efficiency of use of frequency resources.

In this regard, although a case has been described with the above embodiment where the present invention is configured as an antenna, the present invention is also applicable to an antenna port.

The term, antenna port, refers to a theoretical antenna configured with one or a plurality of physical antennas. That is, an antenna port does not always refer to one physical antenna, and can also refer to, for example, an array antenna configured with a plurality of antennas.

For example, in 3GPP LTE, how many physical antennas an antenna port is configured with is not prescribed, and an antenna port is prescribed as a minimum unit by which a base station can transmit a different reference signal.

Further, an antenna port is also prescribed as a minimum unit with which the weight of precoding vector is multiplied.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here, but this may also be referred to as "IC", "system LSI", "super LSI", or "ultra LSI," depending on differing extents of integration.

Further, the method of circuit integration is by no means limited to LSI's, and implementation using dedicated circuitry or general purpose processors is also possible. After LSI manufacture, utilization of a programmable field programmable gate array (FPGA) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is possible, for example.

The disclosure of Japanese Patent Application No. 2009-017892, filed on Jan. 29, 2009, including the specification, drawings and abstract, is incorporated herein by reference in its entirety.

INDUSTRIAL APPLICABILITY

The present invention can be used as a base station apparatus, a mobile station apparatus, and a transmission method in independent uplink/downlink cell data transmission, and it is possible to suppress the amount of increase in reception and demodulation and decoding processing of uplink scheduling information in independent uplink/downlink cell data transmission in which an uplink data channel and a downlink data channel are connected to their respective optimum cells.

REFERENCE SIGNS LIST

100 LTE-A base station
100a LTE base station
200 LTE-A mobile station
200a LTE mobile station
101 Setting section
102 Control section
103 PDCCH generation section
104, 105, 106, 113, 209 Modulation section
107, 211 Arrangement section
108, 212 IFFT section
109, 213 CP adding section
110, 214 RF transmission section
111, 201 Antenna
112 PDCCH+ generation section
202 RF reception section
203 CP removing section
204 FFT section
205 Demultiplexing section
206 Setting information reception section
207 PDCCH reception section
208 PDSCH reception section
210 DFT section
215 PDCCH+ reception section

The invention claimed is:

1. A communication apparatus comprising:
   circuitry which is operative to map first control information including scheduling information of a physical uplink shared channel (PUSCH) in a first region of a data channel region, the data channel region being different from a control channel region in which second control information including scheduling information of a physical downlink shared channel (PDSCH) is mapped, and the first region being different from a second region of the data channel region in which the PDSCH is mapped based on the second control information; and
   a transmitter which is operative to transmit the mapped first control information to a terminal; and
   a receiver which is operative to receives the PUSCH transmitted from the terminal based on the first control information.

2. The communication apparatus according to claim 1, wherein the receiver, in operation, receives the PUSCH transmitted to a first cell that is associated with an ID different from an ID of a second cell, from which the PDSCH is transmitted to the terminal.

3. The communication apparatus according to claim 1, wherein the PUSCH is associated with a first ID, and the PDSCH is associated with a second ID that is different from the first ID.

4. The communication apparatus according to claim 1, wherein the first control information is mapped on a resource block basis.

5. The communication apparatus according to claim 1, wherein the first control information is mapped in a symbol other than a symbol in which the second control information is mapped.

6. A communication method comprising:
   mapping first control information including scheduling information of a physical uplink shared channel (PUSCH) in a first region of a data channel region, the data channel region being different from a control channel region in which second control information including scheduling information of a physical downlink shared channel (PDSCH) is mapped, and the first region being different from a second region of the data channel region in which the PDSCH is mapped based on the second control information; and
   transmitting the mapped first control information to a terminal; and
   receiving the PUSCH transmitted from the terminal based on the first control information.

7. The communication method according to claim 6, wherein the receiving includes receiving the PUSCH transmitted to a first cell that is associated with an ID different from an ID of a second cell, from which the PDSCH is transmitted to the terminal.

8. The communication method according to claim 6, wherein the PUSCH is associated with a first ID, and the PDSCH is associated with a second ID that is different from the first ID.

9. The communication method according to claim 6, wherein the first control information is mapped on a resource block basis.

10. The communication method according to claim 6, wherein the first control information is mapped in a symbol other than a symbol in which the second control information is mapped.

* * * * *